United States Patent
Rubin et al.

[15] 3,699,139
[45] Oct. 17, 1972

[54] SYNTHETIC CRYSTALLINE ALUMINOSILICATE

[72] Inventors: Mae K. Rubin, Bala Cynwyd, Pa.; Edward J. Rosinski, Deptford, N.J.

[73] Assignee: Mobil Oil Corporation

[22] Filed: Oct. 16, 1969

[21] Appl. No.: 867,063

[52] U.S. Cl. ............... 260/448 C, 23/113, 252/455 Z
[51] Int. Cl. ............................................. C01b 33/28
[58] Field of Search ...................... 23/111–113; 252/455; 260/448

[56] References Cited

UNITED STATES PATENTS

| | | | |
|---|---|---|---|
| 3,306,922 | 2/1967 | Barrer et al. | 260/448 |
| 3,308,069 | 3/1967 | Wadlinger et al. | 252/455 |
| 3,375,205 | 3/1968 | Wadlinger et al. | 252/455 |

FOREIGN PATENTS OR APPLICATIONS

| | | | |
|---|---|---|---|
| 624,518 | 7/1961 | Canada | 23/113 |

*Primary Examiner*—Edward J. Meros
*Attorney*—Oswald G. Hayes, Andrew L. Gaboriault, Raymond W. Barclay, James F. Woods and Dennis P. Santini

[57] ABSTRACT

A novel synthetic crystalline aluminosilicate zeolite having a rigid three dimensional structure characterized by having benzyltrimethylammonium ions in the structure; method for preparing the crystalline aluminosilicate from a mixture of sodium oxide, potassium oxide, silica, alumina, water and benzyltrimethylammonium compound and organic compound conversion with a catalytically-active form of the new zeolite.

4 Claims, No Drawings

SYNTHETIC CRYSTALLINE ALUMINOSILICATE

BACKGROUND OF THE INVENTION

1. Field of the Invention

This invention relates to a novel porous crystalline aluminosilicate zeolite having a rigid three dimensional structure characterized by the presence of benzyltrimethylammonium ions in the structure. More particularly, this invention relates to catalytically-active forms of the novel crystalline aluminosilicate zeolite to the methods for the preparation thereof and to organic compound conversion with catalytically-active forms therewith, especially shape selective hydrocarbon conversion.

2. Discussion of the Prior Art

Natural erionite is an aluminosilicate containing sodium and potassium. It is characterized by having a distinctive X-ray diffraction pattern which reveals what crystallographers call odd "l" lines. These odd "l" lines are indicative of what is known as "stacking faults" which are caused, for example, by a horizontal displacement of a layer of aluminosilicate tetrahedra so that the crystal lattice parameter is about one-half that which would normally be expected if the tetrahedra where repeated in the proper and expected order. The layers of tetrahedra are rotated about 60° so that the through pore size of the zeolite is substantially decreased. Natural erionite is useful in a catalytic form as a shape selective catalyst owing largely to the small cage structure of this zeolite and also due to the presence of these "stacking faults". A material known as Linde T resembles natural erionite in revealing these "stacking faults" in its X-ray diffraction pattern. It, too, is moderately useful as a catalyst for certain hydrocarbon conversion reactions.

Both of above zeolites desirably can be improved with respect to selectivity. Moreover, the naturally occurring material is often non-uniform in quality, varying in impurity content and the like from deposit to deposit.

SUMMARY OF THE INVENTION

Broadly, this invention contemplates a synthetic crystalline aluminosilicate having a composition, expressed in terms of mole ratios of oxides, as follows:

$$1 \pm 0.2 \, M_{2/n}O : Al_2O_3 : 5 \text{ to } 20 \, SiO_2 : 0-10 \, H_2O$$

wherein M is one or more cations and $n$ is the valence of M and having the X-ray diffraction pattern of Table 1 of the specification below. In the as synthesized form, the new zeolite of the present invention has a composition, expressed in terms of mole ratios of oxides, as follows:

$$xR_2O : yK_2O : (1\pm0.2)-(x+y) \, Na_2O : Al_2O_3 : Z \, SiO_2$$

Wherein $x$ is a value between greater than 0 and less than 0.4, $y$ is a value between about 0.3 and about 0.6, preferably between about 0.4 and about 0.5 and R is benzyltrimethylammonium and Z is 5–20, preferably about 6 to about 15. The as synthesized form of the new zeolite has substantially the X-ray diffraction pattern of Table 1.

The composition of this invention is initially prepared from a mixture having the following composition ratio:

|  | Broad | Preferred |
|---|---|---|
| $R^+/R^+ + K^+ + Na^+$ | 0.03–0.4 | 0.03–0.2 |
| $OH^-/SiO_2$ | 0.3–1.0 | 0.4–0.8 |
| $H_2O/OH^-$ | 15–60 | 20–40 |
| $SiO_2/Al_2O_3$ | 15–50 | 20–30 |
| $K^+/K^+ + Na^+$ | 0.05–0.2 | 0.09–0.15 |

The mixture is stirred until a homogeneous mass is obtained and the mass is heated at a temperature up to, but below, the decomposition temperature of the mixture until crystals of the aluminosilicate are obtained. When crystals are obtained, they are filtered from the supernatant solution, washed and dried. Generally, the mixture is maintained at a temperature of at least 20°C. up to 150°C. during crystallization. Generally speaking, a crystalline zeolite having the X-ray diffraction pattern of Table 1 below crystallizes from the reaction mixture for a period of time between 1 and 120 days when the crystallization temperature is 100°C. Preferably, the crystallization is performed in a plastic vessel such as a polypropylene vessel.

The zeolite thus prepared is a highly crystalline material whose X-ray diffraction pattern is characterized by numerous odd "l" lines which indicate that the zeolite has numerous stacking faults. These stacking faults result when the layers of tetrahedra are rotated about 60°. The porosity of the zeolite is thus affected. The material is useful as a shape selective catalyst owing largely to the small cage structure.

The novel crystalline aluminosilicate can be further defined and identified by its novel crystal structure. The characteristic X-ray diffraction pattern of this new zeolite has the values as set forth in Table I below.

The X-ray data given in Table II are for a typical example of the novel crystalline aluminosilicate.

TABLE I

| d(A°) | Relative Intensity |
|---|---|
| 11.5 ± 0.2 | VS |
| 9.2 ± 0.2 | W |
| 7.6 ± 0.2 | W |
| 6.59 ± 0.15 | S |
| 6.12 ± 0.15 | M |
| 5.34 ± 0.10 | W |
| 4.33 ± 0.05 | S |
| 4.15 ± 0.05 | M |
| 3.75 ± 0.05 | S |
| 3.59 ± 0.05 | S |
| 3.30 ± 0.05 | M |
| 3.16 ± 0.05 | M |
| 2.83 ± 0.05 | S |
| 2.80 ± 0.05 | W |
| 2.67 ± 0.05 | W |
| 2.48 ± 0.05 | W |

VS – Very Strong
S – Strong
M – Medium
W – Weak

TABLE II

| Bragg Angle 2θ | interplanar spacing d(A.) | Relative Intensity I/I₀ |
|---|---|---|
| 7.70 | 11.5 | 100 |
| 9.6 | 9.2 | 19 |
| 11.65 | 7.60 | 19 |
| 13.4 | 6.59 | 52 |
| 14.0 | 6.32 | 16 |
| 15.45 | 6.12 | 27 |
| 16.55 | 5.34 | 22 |

| 2θ | d | I |
| --- | --- | --- |
| 17.6 | 5.03 | 1 |
| 17.9 | 4.94 | 1 |
| 19.25 / 19.45 | 4.57 | 25 |
| 20.55 | 4.32 | 74 |
| 21.4 | 4.15 | 34 |
| 23.4 | 3.81 | 62 |
| 23.7 | 3.75 | 75 |
| 24.75 | 3.59 | 54 |
| 26.2 | 3.40 | 6 |
| 27.05 | 3.30 | 31 |
| 28.3 | 3.16 | 34 |
| 28.7 | 3.10 | 4 |
| 30.6 | 2.91 | 13 |
| 31.4 | 2.83 | 74 |
| 31.9 | 2.80 | 26 |
| 33.55 | 2.665 | 17 |
| 36.1 | 2.48 | 21 |
| 36.35 | 2.475 | 3 |
| 38.15 | 2.36 | 3 |
| 39.5 | 2.28 | 4 |
| 41.05 | 2.20 | 8 |
| 42.85 | 2.11 | 7 |
| 43.65 | 2.07 | 5 |
| 45.9 | 1.975 | 6 |
| 46.5 | 1.95 | 4 |
| 48.1 | 1.89 | 11 |
| 48.8 | 1.865 | 4 |
| 49.9 | 1.825 | 10 |
| 50.6 | 1.80 | 2 |
| 51.6 | 1.77 | 18 |
| 54.25 | 1.69 | 5 |
| 55.85 | 1.645 | 16 |
| 58.5 | 1.575 | 10 |

These values were determined by standard techniques employing a scan speed of one-half degree per minute. The radiation was the K-alpha doublet of copper, and a Geiger counter spectrometer with a strip chart pen recorder was used. The peak heights, I, and the positions as a function of two times theta, where theta is the Bragg angle, were read from the spectrometer chart. From these, the relative intensities, $100\ I/I_0$, where $I_0$ is the intensity of the strongest line or peak and $d$ (obs), the interplanar spacing in Angstroms, corresponding to the recorded lines, were calculated. It should be understood that the X-ray diffraction pattern is characteristic of all the species of the novel composition, including those wherein the sodium ion has been exchanged as by base exchange for another cation or cations. The exchanged composition has substantially the same X-ray diffraction pattern as that set forth in Table I above.

Preferably, the alkali metal content, especially the sodium, is exchanged out of the composition for another cationic form as the sodium form of the zeolite tends to be less catalytically active and stable than other forms. The sodium and/or potassium can at least partially be removed from the aluminosilicate by ion exchange. The sodium and/or potassium cations can be exchanged for hydrogen ions by treating the aluminosilicate with acids. Alternatively, it can be treated with a source of ammonium, alkylammonium, or arylammonium cation providing steric hindrances do not prevent the cation from entering the cages of the zeolite. If the sodium and part of the potassium are replaced for an ammonium cation or complex, the potassium-hydrogen form is prepared therefrom by heating the composition at a temperature above about 400°F. causing evolution of ammonia and retention of a proton in the composition at the site previously occupied by the ammonium ion.

Other replacing cations include cations of the metals of Groups IA other than sodium and potassium, IB-VIII of the Periodic Table; especially metals of Groups II and III, including the rare earth metals, tin, lead, Group IVB comprising titanium, zirconium, and hafnium; metals of the actinide series, antimony, bismuth, chromium; also Group VIIB and Group VIII. Regardless of the cations replacing the sodium and part of the potassium in the synthesized form of the composition, the spatial arrangement of the aluminum, silicon and oxygen atoms which form the basic crystal lattice of this material, remains essentially unchanged by the described replacement of sodium or potassium as determined by X-ray diffraction analysis of the ion-exchanged material.

Ion exchange of the zeolite can be accomplished conventionally by contacting the zeolite with a solution, suitably an aqueous solution, of a salt of the exchanging cation. Additionally, the composition can undergo solid state exchange to remove sodium and partial potassium and substitute another cation therefor. Preferably a solution exchange is employed.

While water will ordinarily be the solvent in the base exchange solutions employed, it is contemplated that other solvents, although generally less preferred, can be used in which case it will be realized that the above list of exchange compounds can be expanded. Thus, in addition to an aqueous solution, alcohol solutions and the like of the exchange compounds can be employed in producing the exchanged catalyst of the present invention. Generally, the alkali metal content is reduced to less than 5 percent by weight and preferably less than 3 weight percent. When the exchanged aluminosilicate is prepared, it is generally, thereafter, treated with a suitable solvent, e.g., water, to wash out any of the anions which may have become temporarily entrained or caught in the pores or cavities of the crystalline composition.

As indicated above, the aluminosilicates prepared by the method of this invention are formed in a wide variety of particulate sizes. Generally speaking, the particles can be in the form of a powder, or made into a granule, or a molded product, such as extrudate having particle size sufficient to pass through a 2 mesh (Tyler) screen and be retained on a 400 mesh (Tyler) screen. In cases where the catalyst is molded, such as by extrusion, the aluminosilicate can be extruded before drying or dried or partially dried and then extruded.

If desired, the new catalyst can be incorporated with other materials, such as active and inactive inorganic materials, which function as a matrix for the new catalyst. These inorganic materials include naturally occurring clays and metal oxides. The latter can be either naturally occurring or in the form of gelatinous precipitates or gels including mixtures of silica and metal oxides. The inactive materials suitably serve, among other things, as diluents to control the amount of conversion in a given process so that the products can be obtained economically and orderly without employing other means of controlling the rate of reaction. The new zeolite can be incorporated into a naturally occurring clay, such as a kaolinite, which improves the crush strength of the catalyst and makes it more suitable in commercial operations. These inorganic oxide matrix materials function as binders for the zeolite. Naturally occuring clays which can be composited with the new catalyst include the montmorillonite and kaolin family, which families include the subbentonites and the kaolins commonly known as Dixie McNamee-Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the catalyst also include inorganic hydrous oxides, notably alumina.

In addition to the foregoing materials, the catalyst can be composited with a porous matrix material such as silica-alumina, silica-magnesia, silica-zirconia, silica-thoria, silica-beryllia, silica-titania as well as ternery compositions such as silica-alumina-thoria, silica-alumina-zirconia, silica-alumina-magnesia and silica-magnesia-zirconia. It can be formed as a cogel with one of these porous matrix materials. The relative proportions of finely divided novel crystalline aluminosilicate and inorganic oxide gel matrix vary widely with the crystalline aluminosilicate content ranging from about 5 to about 90 percent by weight and more usually, particularly when the composite is prepared in the form of beads in the range of about 5 to about 50 percent by weight of the composite.

One method of preparing the catalyst is to mix the various solutions employed containing the various oxides in a mixing nozzle so as to effect maximum contact of the respective ingredients together.

The novel zeolite of this invention can contain a hydrogenation-dehydrogenation component, such as an oxide of a metal, a sulfide of a metal, or a metal of Groups VI and VIII of the Periodic Table, and manganese. Representative elements which can be incorporated in the zeolite are cobalt, nickel, platinum, palladium, ruthenium, rhodium, osmium, iridium, chromium, molybdenum, and tungsten. The most preferred metals are platinum, palladium, nickel, zinc, and cadmium. These materials either in their elemental form, as oxides, or sulfides can be impregnated into the zeolite or in cationic form can be exchanged into the zeolite for a sodium and part of the potassium cation. The methods for impregnation and/or exchange are those commonly used in the art. These hydrogenation-dehydrogenation components can be intimately combined by other means, as physical admixture. The resultant catalyst, especially in a form containing less than 4 percent by weight alkali metal, preferably less than 3 percent, is useful in hydrocracking and reforming as well as other processes involving hydrogenation or dehydrogenation.

Employing the catalyst of this invention, lighter petroleum stock and similar lower molecular weight hydrocarbons can be hydrocracked at temperature between 400°F. and 825°F. using molar ratios of hydrogen to hydrocarbon charge in the range between 2 and 80. The pressure employed will vary between 10 and 2,000 psig. and the liquid hourly space velocity between 0.1 and 10.

Employing a form of the catalyst not containing a hydrogenation-dehydrogenation component, the catalyst can be employed for catalytic cracking, using a liquid hourly space velocity between about 0.5 and 50, a temperature between about 550°F. and 1,200°F. and a pressure between subatmospheric and several hundred atmospheres.

Additionally, catalytically active forms of the zeolite of this invention find extensive utility in a wide variety of hydrocarbon conversion processes including hydroisomerization, hydrodealkylation, hydrodisproportionation, hydrocarbon oxidation, dehydrogenation, desulfurization, hydrogenation, hydrocracking, polymerization and the like provided, of course, that the reactant to undergo conversion can enter the pores of the zeolite and the product can be removed from within the zeolite.

Catalytically-active forms of the zeolite of the present invention, as indicated above, are useful for a wide variety of hydrocarbon conversion reactions. However, the compositions find particular use in shape selective catalysis especially shape selective hydrocracking. Thus, a form of the catalyst containing a hydrogenation component is suitable to preferentially crack normal paraffins in a mixture comprising normal paraffins and isoparaffins. Other shape selective reactions can also be performed employing catalytically-active forms of the present catalyst. Shape selective catalysis is desired in many instances where it is desired to convert only those compounds which, due to their critical size, are admitted into the small pores of the zeolite.

The above crystalline zeolite especially in its metal, hydrogen, ammonium, alkylammonium and arylammonium forms can be beneficially converted to another form by thermal treatment. This thermal treatment is generally performed by heating one of these forms at a temperature of at least 700°F. for at least 1 minute and generally not greater than 20 hours. While subatmospheric pressure can be employed for the thermal treatment, atmospheric pressure is desired for reasons of convenience. It is preferred to perform the thermal treatment in the presence of moisture although moisture is not absolutely necessary. The thermal treatment can be performed at a temperature up to about 1,600°F. at which temperature some decomposition begins to occur. The thermally treated product is particularly useful in the catalysis of certain hydrocarbon conversion reactions.

In order to more fully illustrate the nature of the present invention and the manner of practicing the same, the following examples are presented. In the catalytic results reported below, the term selectivity factor is used. This factor is a ratio of the rate constant for cracking normal hexane employing a catalyst comprising the aluminosilicate relative to the rate constant for cracking isohexane employing a catalyst comprising the aluminosilicate. Thus, this selectivity factor is a measurement of the composition's ability to preferentially crack normal paraffins in a mixture of normal paraffins with isoparaffins.

EXAMPLE 1

A composition comprising 19.65 grams sodium aluminate (41.8 weight percent alumina, 31.6 weight percent $Na_2O$), 59.0 grams sodium hydroxide, 12.12 grams potassium hydroxide (85.5 weight percent) and 336 grams water was placed into a vessel. To that was added a 60 percent benzyltrimethylammonium chloride solution weighing 40.5 grams. 468 Grams of colloidal silica (30 percent $SiO_2$) were added to the resultant solution which had been mixed for 15 minutes. The resultant mix was then stirred for one-half hour and transferred to a polypropylene vessel. The composition of the reaction mixture had the following ratios:

$$(R^+/R^+ + K^+ + Na^+) = 0.065$$

$$OH^-/SiO_2 = 0.8$$

$$H_2O/OH^- = 20.3$$

$$SiO_2/Al_2O_3 = 28.6$$

$$(K^+/K^+ + Na^+) = 0.1$$

It was then heated at 212°F. for 13 days. A crystalline material precipitated. The material was washed and dried and subjected to X-ray analysis which showed it to have the X-ray diffraction pattern of Table 1. The surface area of the product was determined to be 420 meters per square gram. The material was calcined for 16 hours at 1,000°F. After that, its sorption properties were determined. It sorbed 0.8 weight percent cyclohexane and 7.5 weight percent normal hexane both determined at 20 mmHg and 25°C. It sorbed 17.9 weight percent water determined at 12 mmHg and 25°C. The product analysis, in terms of mole ratios of oxides, was as follows:

$$0.1\ R_2O : 0.4\ K_2O : 0.5\ Na_2O : Al_2O_3 : 6.9\ SiO_2$$

The sorption properties above indicate that the material has shape selective properties in that it sorbs appreciable amounts of normal hexane while substantially excluding cyclohexane.

EXAMPLE 2

The preparation of Example 1 was repeated except that after 10 days of being heated at 212°F. crystals precipitated from the reaction mixture. The product was crystalline and had a surface area of 415 square meters per gram. It sorbed 1.0 weight percent cyclohexane, 6.5 weight percent normal hexane and 18.0 weight percent water determined under the conditions of Example 1. The product analysis, in terms of mole ratios of oxides, was as follows:

$$0.1\ R_2O : 0.5\ K_2O : 0.6\ Na_2O : Al_2O_3 : 7.5\ SiO_2$$

EXAMPLE 3

Example 1 was repeated except that the amounts of some ingredients were changed. The amounts of ingredients were as follows:

| Sodium Aluminates | (41.8wt.% $Al_2O_3$, 31.6wt.% $Na_2O$) | 19.7 grams |
|---|---|---|
| KOH | (85.5wt.%) | 8.48 grams |
| NaOH | (99.5wt.%) | 41.6 grams |
| $H_2O$ | | 336 grams |
| 60 percent benzyltrimethylammonium chloride solution | | 28.4 grams |
| Colloidal Silica | (30wt.% $SiO_2$) | 468 grams |

The composition of the reaction mixture had the following ratios:

$$(R^+/R^+ + K^+ + Na^+) = 0.065$$

$$OH^-/SiO_2 = 0.56$$

$$H_2O/OH^- = 20.6$$

$$SiO_2/Al_2O_3 = 28.6$$

$$(K^+/K^+ + Na^+) = 0.1$$

Crystallization occurred after 32 days heating at 212°F. The product was crystalline and had the X-ray diffraction pattern of Table 1 above. It sorbed 0.8 weight percent cyclohexane, 7.9 weight percent normal hexane and 14.7 percent water. The product analysis, in terms of mole ratios of oxides, was as follows:

$$0.2\ R_2O : 0.4\ K_2O : 0.3\ Na_2O : Al_2O_3 : 9.4\ SiO_2$$

EXAMPLE 4

Example 3 was repeated except that the mixture was held at 212°F. for 72 days. The product was crystalline and had a surface area of 449 meters per gram. After it was calcined for 18 hours at 1,000°F. its sorption properties were determined in accordance with the method described in Example 1. It was was found to sorb 0.6 weight percent cyclohexane, 8.7 weight percent normal hexane, and 17.4 weight percent water. The product analysis, in terms of mole ratios of oxides, were as follows:

$$0.26\ R_2O : 0.41\ K_2O : 0.32\ Na_2O : Al_2O_3 : 9.8\ SiO_2$$

EXAMPLE 5

Example 1 was repeated except that the amounts of the various reactants were changed. They were as follows:

| $NaAlO_2$ | (41.8 wt.% $Al_2O_3$, 31.6 wt.% $Na_2O$) | 49.1 grams |
|---|---|---|
| KOH | (85.5 wt.%) | 21.2 grams |
| NaOH | (99.5 wt.%) | 1.04 grams |
| $H_2O$ | | 840 grams |
| 60 percent benzyltrimethylammonium chloride solution | | 71.0 grams |
| Colloidal Silica | (30% $SiO_2$) | 1170 grams |

The product crystallized after 49 days of being heated at 212°F. It had a surface area of 455 square meters per gram. After being calcined for 16 hours at 1,000°F., its sorption properties were determined as in Example 1. It sorbed 0.6 weight percent cyclohexane, 8.6 weight percent normal hexane and 16.3 weight percent water. The product composition, in terms of mole ratios of oxides, was as follows:

$$0.2\ R_2O : 0.4\ K_2O : 0.3\ Na_2O : Al_2O_3 : 9.9\ SiO_2$$

EXAMPLE 6

Example 3 was repeated except that the amount of benzyltrimethylammonium chloride solution employed was 73.0 grams. The composition of the reaction mixture was as follows:

$R^+/R^+ + K^+ Na^+ = 0.147$ $OH^-/SiO_2 = 0.61$ $H_2O/OH^- = 28.7$ $SiO_2/Al_2O_3 = 28.6$ $K^+/K^+ + Na^+ = 0.095$

The product crystallized after 49 days of being heated at 212°F. It had the X-ray diffraction pattern of Table I. After being calcined for 16 hours at 1,000°F., its sorption properties were determined as in Example 1. It sorbed 0.6 weight percent cyclohexane, 8.8 weight percent normal hexane, and 16.2 weight percent water.

EXAMPLE 7

23 Grams of the product of Example 2 were put into 300 grams of a solution comprising 5 percent by weight rare earth chloride ($RECl_3 \cdot 6H_2O$) and 2 weight percent $NH_4Cl$. The mixture was refluxed at 212°F. for 2 hours. Supernatant liquid was decanted and the filter cake was then added to 300 grams of the same solution. It was again refluxed at 212°F. for 2 hours for a second exchange followed by filtration and followed by another exchange for a total of 3 identical exchanges. The solution was washed until chloride free, dried at 230°F. and calcined for 10 hours at 1,000°F. It sorbed, under the conditions reported in Examples 1, 0.9 weight percent cyclohexane, 8.8 weight percent normal hexane, and 21.1 weight percent water. It gave an alpha value at 600°F. of 7,837 which is indicative of its ability to crack normal hexane. The alpha value was determined in accordance with *Superactive Crystalline Aluminosilicate Hydrocarbon Catalysts*, P.B. Weisz et al. *Journal of Catalysis*, Volume 4, Number 4, August, 1965.

The material was tested for its ability to shape selectively hydrocrack normal hexane in admixture with isohexane. A blend consisting of 50 weight percent normal hexane and 50 weight percent isohexane (2-methylpentane) was passed at a flow rate of 10 ml. per hour together with hydrogen at a flow rate of 4 liters per minute measured at atmospheric pressure and 60°F. over 3.5 cc. of the catalyst at a temperature of 900°F. and a pressure of 500 psig. At these conditions, the LHSV is 2.86 and the hydrogen to hydrocarbon mole ratio is about 130. After 1 hour on stream the products were evaluated. 68.6 Weight percent of the normal hexane was hydrocracked while only 9.4 weight percent of the isohexane was hydrocracked giving a selectivity factor of 11.8.

EXAMPLE 8

The material of Example 3 was exchanged with rare earth metals and ammonium and further treated as in Example 7. Under the conditions of Example 1, it sorbed 1.0 weight percent cyclohexane, 9.6 weight percent normal hexane and 20.8 weight percent water. Its alpha value was 24,600. Shape selective hydrocracking as in Example 7 revealed that it caused 81.2 weight percent of normal hexane to be cracked. Only 9.2 weight percent of the isohexane was cracked. The selectivity factor was 17.3.

EXAMPLE 9

The material of Example 5 was calcined for 10 hours at 1,000°F. It was then exchanged with 5 percent ammonium chloride employing 3 contacts of one hour each. The exchange was at room temperature and the zeolite and the exchange solution were stirred to assist in the exchange. 25 Grams of the exchanged material was contacted with 115 cc. of 0.5 M solution $NiSO_4 \cdot 6 H_2O$ for 4 hours at 210°F. The material was filtered, washed, dried at 230°F. and calcined for 10 hours at 1,000°F. This converted the zeolite into the nickel-acid potassium form. Its sorption properties were determined as in Example 1. It sorbed 3.7 weight percent cyclohexane, 9.3 weight percent normal hexane, and 18.9 weight percent water. The ammonium form of the material showed an alpha value of 18,000. Shape selective catalytic results as in Example 7, employing the nickel-acid potassium form of the zeolite showed that it caused 87.8 percent of the normal hexane to be cracked while only 32.4 weight percent of the isohexane was cracked.

From the foregoing, it is readily apparent that the novel zeolite material of the present invention is particularly useful in cracking and hydrocracking especially those forms where shape selective catalysis of a mixture of isomers is desired. Accordingly, the present invention finds particular use in post reforming hydrocracking wherein it is desired to convert normal paraffins which are characterized by a low octane number of propane for LPG use without converting substantial amounts of the isoparaffins which are characterized by good octane value.

We claim:

1. A novel crystalline aluminosilicate having a composition, expressed in terms of mole ratios of oxides as follows:

$$xR_2O : yK_2O : (1+0.2)-(x+y) Na_2O : Al_2O_3 : 5-20 SiO_2 : 0-10 H_2O$$

wherein $x$ is a value between greater than 0 and less than 0.4 and $y$ is a value between about 0.3 and about 0.6 and R is benzyltrimethylammonium and an X-ray deffraction pattern having the values set forth in Table I of the specification.

2. A novel crystalline aluminosilicate according to claim 1 wherein $y$ is between about 0.4 and 0.5.

3. A method of preparing the crystalline aluminosilicate of claim 1 which comprises forming a reaction mixture comprising sources of silica, alumina, sodium oxide, potassium oxide, water and a benzyltrimethylammonium compound, the mixture having the following composition ratios:

$R^+/R^+ + K^+ + Na^+ = 0.03 - 0.4$ $OH^-/SiO_2 = 0.3 - 1.0$ $H_2O/OH^- = 15 - 60$ $SiO_2/Al_2O_3 = 15 - 50$ $K^+/K^+ + Na^+ = 0.05 - 0.2$ $R^+$ = benzyltrimethylammonium and maintaining the reaction mixture at a temperature of at least 20°C to 150°C until crystals of said crystalline aluminosilicate are formed.

4. A method according to claim 3 wherein the reaction mixture has the following composition:

$$R^+/R^+ + K^+ + Na^+ = 0.03 - 0.20$$
$$OH^-/SiO_2 = 0.4 - 0.8$$
$$H_2O/OH^- = 20 - 40$$
$$SiO_2/Al_2O_3 = 20 - 30$$
$$K^+/K^+ + Na^+ = 0.09 - 0.15$$

$R^+$=benzyltrimethylammonium.

* * * * *